United States Patent
Klotsche

(10) Patent No.: US 7,346,080 B2
(45) Date of Patent: Mar. 18, 2008

(54) PROCEDURE AND CONTROLLER FOR THE ALLOCATION OF VARIABLE TIME SLOTS FOR A DATA TRANSMISSION IN A PACKET-ORIENTED DATA NETWORK

(75) Inventor: Ralf Klotsche, Neuenbürg (DE)

(73) Assignee: Alcatel, Paris (FR)

( * ) Notice: Subject to any disclaimer, the term of this patent is extended or adjusted under 35 U.S.C. 154(b) by 1043 days.

(21) Appl. No.: 10/299,798

(22) Filed: Nov. 20, 2002

(65) Prior Publication Data

US 2003/0185243 A1    Oct. 2, 2003

(30) Foreign Application Priority Data

Nov. 21, 2001   (DE) .............................. 101 57 103

(51) Int. Cl.
    *H04J 3/00*   (2006.01)
(52) U.S. Cl. .................. 370/498; 370/230.1; 370/443
(58) Field of Classification Search ................ 370/230, 370/442, 443, 458, 498
    See application file for complete search history.

(56) References Cited

U.S. PATENT DOCUMENTS

| | | | |
|---|---|---|---|
| 5,594,868 A * | 1/1997 | Nakagoshi et al. ......... 709/234 |
| 5,852,630 A * | 12/1998 | Langberg et al. ........... 375/219 |
| 5,886,981 A * | 3/1999 | Kamiya ....................... 370/230 |
| 5,953,336 A | 9/1999 | Moore et al. |
| 6,011,798 A | 1/2000 | McAlpine |
| 6,542,463 B1 * | 4/2003 | Heeke ......................... 370/230 |

FOREIGN PATENT DOCUMENTS

| | | |
|---|---|---|
| EP | 0 802 698 A2 | 10/1997 |
| EP | 1056244 A2 | 11/2000 |
| WO | WO 00/60590 | 10/2000 |
| WO | WO 01/31861 A1 | 5/2001 |

* cited by examiner

*Primary Examiner*—Hassan Kizou
*Assistant Examiner*—Bo Hui A Zhu
(74) *Attorney, Agent, or Firm*—Sughrue Mion, PLLC

(57) ABSTRACT

The invention relates to a procedure for the allocation of time slots for a transmission of data in variable time slots between a controller of a packet-oriented data network on the one hand and a terminal of a user of the data network on the other hand. The time slots are assigned to a terminal for a data flow following request made by the terminal and in dependence on the transmission capacity available in the data network, and are temporarily stored in a ring buffer before they are allocated to the terminal at a predefinable allocation instant. In order to simplify and accelerate the allocation of time slots in such a data network, it is proposed that a temporal write range be defined in the ring buffer by a variable first upper time threshold and a variable first lower time threshold.

9 Claims, 7 Drawing Sheets

———— End of Defined List
—·—·— Maximum Granting Threshold
— — — — Minimum Granting Threshold
— — — Now on the Wire

PROCEDURE AND CONTROLLER FOR THE ALLOCATION OF VARIABLE TIME SLOTS FOR A DATA TRANSMISSION IN A PACKET-ORIENTED DATA NETWORK

BACKGROUND OF THE INVENTION

The invention is based on a priority application DE 101 57 103.8 which is hereby incorporated by reference.

The present invention relates to a procedure for the allocation of time slots for a transmission of data in variable time slots between a controller of a packet-oriented data network on the one hand and a terminal of a user of the data network on the other hand. The time slots for the data transmission are assigned to a terminal for a data flow following request made by the terminal and in dependence on the transmission capacity available in the data network, and temporarily stored in a ring buffer before they are allocated to the terminal at a predefinable allocation instant.

The invention also relates to a controller for a packet-oriented data network for the transmission of data in variable time slots between the controller on the one hand and a terminal of a user of the data network on the other hand. The controller comprises means for receiving and processing a request made by a terminal for time slots, and means for allocating time slots upon the request made by the terminal. The means for allocation assign the time slots to a terminal in dependence on the transmission capacity available in the data network, and temporarily store the assigned time slots in a ring buffer before the means for allocation allocate the time slots to the terminal at a predefinable allocation instant.

Finally, the present invention also relates to a computer program which can be executed on a computing device, particularly on a microprocessor, of a controller for a packet-oriented data network for the transmission of data in variable time slots.

The data rate available in a data network is determined primarily by the minimum data rate agreed between providers and users (the so-called service level agreement). The available data rate is determined, secondly, by the instantaneous capacity utilization of the data network by data transmission connections. For the use of the data network, the user normally makes a payment to the provider which is dependent on the agreed data rate.

A terminal seeking to transmit data via the data network sends a request for one or more time slots to a controller of the data network. Depending on the availability of time slots or depending on the capacity utilization of the data network, the controller allocates the requested number or fewer time slots to the terminal. In the case of a very high capacity utilization, it may even be the case that the controller is unable to fulfil the request made by the terminal, rejects it and does not allocate any time slots to it whatsoever. The rejected request made by the terminal is stored in a queue (e.g. in a first-in-first-out (FIFO) memory) of the controller and fulfilled at a later instant, at which there is a lesser capacity utilization of the data network, in that time slots which have been requested but not yet allocated are then allocated to the terminal. The requesting terminal and the data flow for which time slots are requested, as well as the number of requested time slots, must be stored in the queue. In addition, a corresponding time stamp must be assigned to each request. The storage of the rejected requests in the queue can be very memory-intensive. If a queue is full, new requests are lost.

Known from the prior art, therefore, for the allocation of time slots, is the practice of taking into account, at the start of a new data transmission, the capacity utilization of the data network as a whole and the bandwidth available on the data network. Once a certain number of time slots have been allocated to a terminal for the data transmission, the user may transmit his data in these time slots even if this data transmission occupies the entire transmission capacity of the data network or a major part of this capacity. During this time, requests for time slots made by other terminals may not be completely fulfilled, or not fulfilled at all. Wait times may occur before the further terminals are serviced. Thus, for the data transmissions of the further terminals, it is not possible to guarantee a minimum response time within which the requested time slots, or a minimum number of time slots, can be assigned to the terminals. This can present substantial problems for applications in which a minimum response time and a minimum data transmission rate must be assured. Such applications are also termed QoS (quality of service) applications. Examples of QoS applications are VoIP (Voice over Internet Protocol) applications.

In the case of so-called Transfer Control Protocol (TCP)/IP applications, the data transmission commences at a relatively low data rate. During a data transmission, the quality of the data transmission is monitored and, if this fulfils a predefinable minimum quality requirement, continuously increased until the minimum requirement is no longer fulfilled. The data transmission rate is then reduced again to the relatively low starting value and slowly increased again. Thus, if the quality of a TCP/IP data transmission so permits, such a data transmission may occupy a major part of the bandwidth available in a data network. In addition, a TCP/IP data transmission can result in a substantial fluctuation of the network capacity utilization. This can be a major disturbance factor for QoS applications.

The procedure according to the invention is applicable to all packet-oriented data networks in which the award of time slots for data transmission must be negotiated between the terminals and the controller.

The data network is designed as, for example, a cable television network via which video and audio data is transmitted according to a predefinable standard. The standard renders possible a data transmission according to the procedure of the initially stated type. A concrete example of such a standard is DVB (Digital Video Broadcasting), which is used primarily in Europe, or DOCSIS (Data Over Cable Service Interface Specification), which is used particularly in the USA. DVB uses a fixed time pattern of, for example, three milliseconds, with 9, 18 or 36 time slots being transmitted per time pattern. In DVB, the two lowest layers of the ISO/OSI layer model are specified, namely, the physical layer and the Media Access Control (MAC) layer, or link layer.

In recent times, increasingly more households have been receiving television signals, no longer via television antennae or satellites, but via a cable television network. In this case, a television transmitter transmits video and audio signals to television sets in the households, over several channels in a television broadcast band, via a so-called combiner, which substantially comprises a frequency multiplexer, and via the cable television network. In order that the cable television network can also be used for QoS applications, a switching device (a so-called router) is provided which is connected to the Internet. The router is additionally connected, via a bidirectional connection, to a controller of the network, a so-called interactive network adapter (INA) which, in turn, is likewise connected to the combiner via a bidirectional connection. The router and the INA can be combined in one device. The terminals for the QoS applications in a household are connected to the cable television network via so-called set-top boxes or so-called cable modems. Thus, the combiner transmits both the video and audio signals of the television transmitter and the data from the Internet into the households, where they are distributed to the appropriate terminals. For example, the video and audio signals are forwarded to a television set and the Internet data is forwarded to a computer. For VoIP applications, the computer is equipped with appropriate add-on modules which permit the output and input of speech.

Also provided as standard in the cable television network are upstream channels which render possible a so-called upstream connection of the terminals to the INA. In comparison with the downstream channels, however, the upstream channels have only a small bandwidth. For certain data applications, however, relatively large amounts of data are also transmitted via the upstream channel. In addition, it must be possible for a certain quality of data transmission to be guaranteed via the upstream channel (e.g., for QoS applications). The quality of a data transmission comprises, in particular, a predefinable minimum transmission rate, a limited delay time (i.e., transmission time of the individual data packets transmitted in the time slots) and a limited jitter (i.e. variation of the transmission time of the individual transmitted data packets).

The operation of controlling and coordinating a data transmission comprises the so-called policing (i.e. the allocation of a limited number of time slots to the individual data flows in order to achieve a required data rate) and the so-called shaping (i.e. the allocation of time slots for optimum exploitation of the bandwidth available in the network). In cable television networks, the upstream channel, due to its small bandwidth, constitutes a bottleneck for the transmission of data. If functions such as policing and shaping are first executed, in a so-called access router of the data network, in the third from bottom layer, the so-called IP layer, of the ISO/OSI layer model, the transmitted data packets have already passed the bottleneck. If, within the scope of the policing and shaping in the access router, data packets already transmitted via the upstream channel were to be dropped, this represents a loss of bandwidth.

The use of ring buffers as queues is known from the prior art (e.g. from EP 1 056 244 A2). The ring buffer revolves at a predefinable clock rate. The known ring buffers have a write pointer and a read pointer which respectively point to (temporally) determined write and read positions in the ring buffer. The ring buffer thus revolves relative to the read and write position so that, following a complete revolution of the ring buffer, each field has been once at the write position and once at the read position.

Such a known ring buffer, however, cannot be used for the allocation of variable time slots for a data transmission in a packet-oriented data network. In this case, data flows with varying allocation instants may be processed. A first processed data flow has an allocation instant in, for example, 30 ms, the next processed data flow has an allocation instant in, for example, 28 ms and the next processed data flow, in turn, has an allocation instant in, for example, 32 ms. It is therefore necessary for the write pointer and/or the read pointer to be (temporally) variable, so that the time slots assigned to a terminal for the data flow can be stored in the appropriate field of the ring buffer in dependence on the exact allocation instant of each data flow.

SUMMARY OF THE INVENTION

The object of the present invention is to simplify and accelerate the allocation of time slots in a data network in which data is transmitted over variable time slots.

To achieve this object the present invention proposes, proceeding from the procedure of the initially stated type, that a temporal write range be defined in the ring buffer by a variable first upper time threshold (maximum granting threshold) and a variable first lower time threshold (minimum granting threshold), a position of a write pointer to a field of the ring buffer within the write range be determined in dependence on the allocation instant, and the time slots assigned to the terminal for the data flow be stored in a field corresponding to the position of the write pointer.

It is proposed, according to the invention, that each data flow in the data network be considered separately and processed separately. Following the receipt of a request made by a terminal of the data network, the request is assigned to a particular data flow in the data network. A sum total assigned to the data flow is increased by the number of requested time slots.

The allocation instant of a data flow can be specified either absolutely or as a relative wait time (starting from the current time to the instant of the allocation of time slots). The allocation instant or the wait time of a data flow is determined within the scope of the control and coordination of the data transmission prior to the allocation of the time slots. The operation of controlling and coordinating comprises the so-called policing (i.e., the allocation of a limited number of time slots to the individual data flows in order to achieve a required data rate) and the so-called shaping (i.e. the allocation of time slots for optimum exploitation of the bandwidth available in the network).

The longer the wait time of a data flow, the lower the data transmission rate of the data flow will be. The wait time may maximally be selected to be of such a length that an agreed minimum transmission rate is still achieved. On the other hand, the wait time should minimally be selected to be of such a length that the data transmission via the data flow does not occupy too much bandwidth, since otherwise there is no bandwidth, or insufficient bandwidth, available for the other data flows.

The data transmission rate of the data flow can be influenced through the wait time; the longer the wait time, the lower the data rate will be. The wait time of a data flow thus permits a reduction of the data rate of the data flow, even down to zero in extreme cases. The wait time can be used to achieve an effective control and coordination of the data transmission, since a prospective assignment of the time slots is possible on the basis of the wait time. The prospective allocation and assignment of the time slots constitutes the subject-matter of the present invention.

The wait times of the data flows can be divided into different categories (so-called policy levels). Time slots are then allocated in dependence on the current policy level of the data flow. A policy level can comprise data flows with different wait times. In the processing of the data flows from one and the same policy level, it can therefore happen that the wait times or the allocation times of successively processed data flows vary and the time slots assigned to a data flow have to be stored sometimes before, sometimes after and sometimes precisely at the current instant. With the present invention, it is possible for the time slots of the processed data flows to be stored in precisely the desired field within a write range of the ring buffer. The present invention enables a prospective assignment of time slots to be performed in a particularly simple manner.

The position of the write pointer is ideally determined in such a way that it points to a field of the ring buffer which, in the case of a predefined clock rate at which the ring buffer revolves further by one field in each case, precisely at the allocation instant of the currently processed data flow, is located at a position at which the content of the field is read out. Time slots, assigned to a data flow, which are stored in the field to which the write pointer points can thereby be read out of the ring buffer and assigned to the data flow at precisely the allocation instant of the data flow. The ring buffer is thus a temporary storage device with the possibility of coordinating the allocation of time slots.

An assignment period, within which the assignment of time slots, planned in advance, is effected, is predefined by the write range. If the allocation point of a currently processed data flow is not so distant from the current time that the time slots assigned to this data flow would have to be stored outside the defined write range, the assignment of time slots for this data flow is shifted to a later instant. The time slots assigned to the data flow can then be stored within the write range at the later instant. A temporally transparent, ordered assignment of time slots is thus rendered possible by the write range.

Due to the variable time thresholds of the write range, the magnitude of the allocation period can be adapted to the current requirements. In order to increase the capacity of the ring buffer, the first upper time threshold can be shifted to a later point. As a result, data flows with more distant allocation instants can also be processed. Conversely, the capacity of the ring buffer can be reduced in that the first upper time threshold is shifted to an earlier point. If the data read out of the ring buffer is transferred away more slowly, for example, into the MAC layer, the first lower time threshold can be shifted to a later point in order to increase a read range within which the data is read out from the ring buffer.

According to an advantageous development of the present invention, it is proposed that a temporal read range be defined by the variable first lower time threshold (minimum granting threshold) and a second lower time threshold (now on the wire), that a read pointer point to a field of the ring buffer within the read range in dependence on a speed at which the read-out time slots are transferred to the terminals, and that the time slots assigned to the terminal for the data flow be extracted from the field to which the read pointer points.

According to a preferred embodiment of the present invention, it is proposed that, for the purpose of storing the assigned slots in the ring buffer, the field, within the write range, to which the write pointer points be determined and that the write pointer be displaced to the nearest free field within the write range if the determined field is already occupied. If the time slots assigned to a data flow can always be stored in the ideally determined field of the ring buffer, the jitter of the data transmission via this data flow is virtually zero. The greater the distance between the field in which the time slots assigned to the data flow are stored and the ideally determined field, the greater the jitter will be. Through appropriate predefinitions for the data flow and through an appropriate design of the ring puffer, it is possible to achieve a situation in which there are always sufficient free fields in the ring buffer for data flows within the scope of QoS applications, so that the time slots assigned to a data flow of a QoS application can always be stored as close as possible to the ideally determined field.

A temporal definition range is advantageously defined, temporally preceding the write range, by a second upper time threshold (end of defined list) and the variable first upper time threshold (maximum granting threshold), in which fields in the write range are defined as particular types. By means of appropriate entries in the definition range, for example, particular fields of the ring buffer can be reserved for data flows of QoS applications. Such a definition range is used, for example, in the case of DVB for the so-called Ranging Contention Reservation.

Preferably, for the purpose of storing the assigned time slots in the ring buffer, the field, within the write range, to which the write pointer points is determined and the write pointer is displaced to the nearest field of a predefined type within the write range if the determined field is not of the predefined type.

As a further way of achieving the object of the present invention, it is proposed, proceeding from the controller of the initially stated type, that the means for allocation comprise:

means for the definition of a temporal write range in the ring buffer by a variable first upper time threshold (maximum granting threshold) and a variable first lower time threshold (minimum granting threshold);

means for determining a position of a write pointer to a field of the ring buffer within the write range in dependence on the allocation instant; and means for storing the time slots assigned to the terminal for the data flow in a field corresponding to the position of the write pointer.

Considered in an ISO/OSI layer model, there is realized in the controller an interface which maps QoS requirements out of the IP (Internet Protocol) layer and higher layers on to the MAC (Media Access Control) layer (so-called link layer).

According to an advantageous development of the present invention, it is proposed that the controller have means for executing a procedure according to any one of claims 2 to 5.

Of particular importance is the realization of the procedure according to the invention in the form of a computer program which can be executed on a computing device, particularly on a microprocessor, of a controller for a data network for the transmission of data in variable time slots and is suitable for the execution of the procedure according to the invention. The computer program is preferably stored on a storage element provided for the controller. In this case, therefore, the invention is realized by a computer program stored on the storage element, so that this storage element provided with the computer program represents the invention in the same way as the procedure for the execution of which the computer program is suitable. In particular, an electronic storage medium, for example, a read-only memory, a random-access memory or a flash memory can be used as a storage element.

BRIEF DESCRIPTION OF THE DRAWINGS

Further features, application possibilities and advantages of the invention are disclosed by the following description of embodiment examples of the invention which are represented in the drawing. In this case, all described or represented features, per se or in any combination, constitute the subject-matter of the invention, irrespective of their combination in the claims or their back-reference, and irrespective of their wording or representation in the description and drawing respectively, wherein:

DESCRIPTION OF THE DRAWINGS

Figure 1:
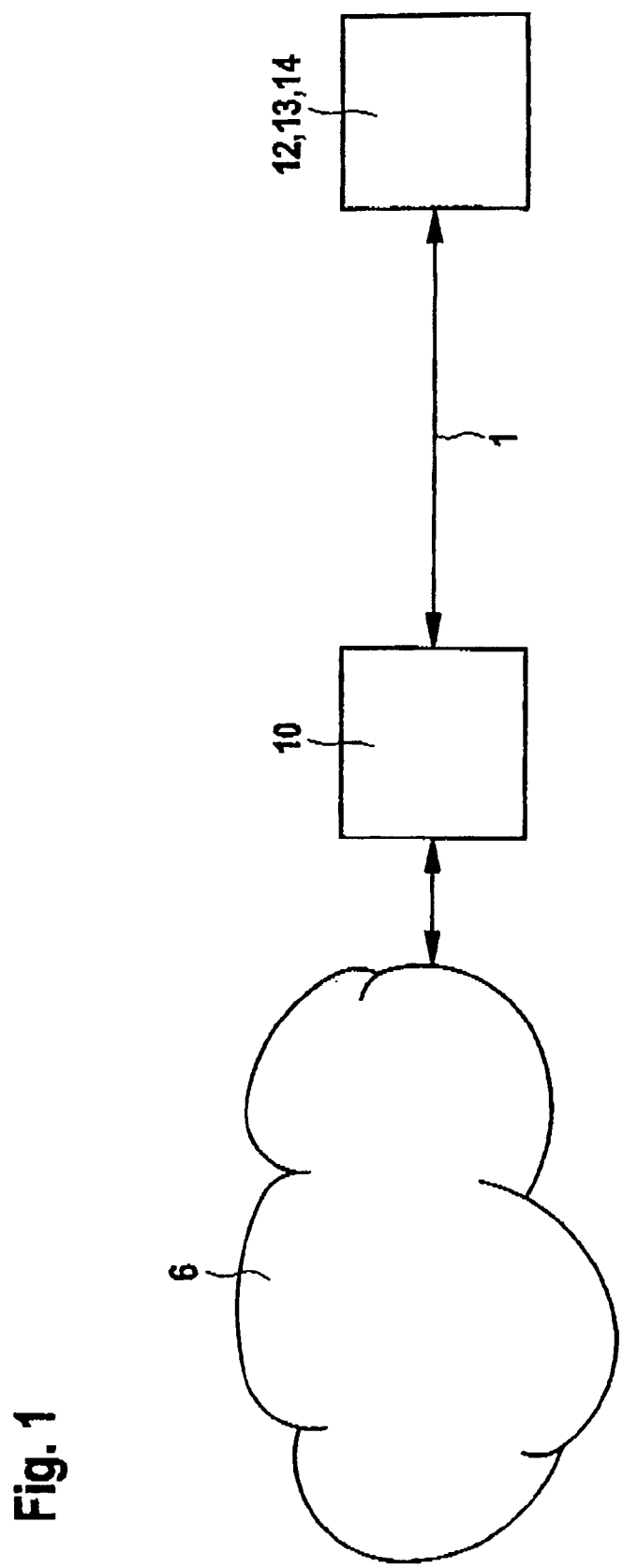
FIG. 1 shows a simplified representation of a data network for the realization of a procedure according to the invention.

In FIG. 1, the reference 1 denotes the entirety of a data network for the realization of a procedure according to the invention. The data network 1 extends between a controller 10 of the data network 1 and a terminal 13, 14. Data is transmitted via the data network in variable time slots.

The controller 10 is in the form of, for example, a so-called interactive network adapter (INA) of a cable television network and the terminal 13, 14 is in the form of, for example, a telephone 14 or an appropriately equipped computer 13. The INA is connected to, for example, the Internet 6. With the present invention, it is also possible, for example, to handle Internet data transmissions with a predefinable minimum transmission rate via the cable television network.

The controller 10 can also be in the form of a satellite transmitting/receiving station of a satellite network and the terminal 13, 14 can be in the form of, for example, a satellite telephone or an appropriately equipped computer. The satellite transmitting/receiving station is connected, for example, via a satellite network 6, to further satellite transmitting/receiving stations. With the present invention, it is also possible to transmit data with a guaranteed data transmission rate via the satellite network. This is advantageous, for example, for satellite telephony with and without video.

The present invention can therefore be used wherever, within the scope of a data transmission in variable time slots via any physical data networks 1, it is necessary to achieve a predefinable quality of the data transmission via the data flow such as, for example, minimum transmission rate, limited delay time (i.e. transmission time of the individual data packets transmitted in the time slots) and limited jitter (i.e., variation of the transmission time of the individual transmitted data packets).

The quality of a data transmission comprises, in particular, a predefinable minimum transmission rate, a limited delay time (i.e. transmission time of the individual data packets transmitted in the time slots) and a limited jitter (i.e. variation of the transmission time of the individual transmitted data packets). These quality stipulations can be agreed, at least partially, between a service provider and a user. Applications which make very stringent demands in respect of the quality of the data transmission are termed QoS (quality of service) applications. The quality of the data transmission via a data flow can also be divided into different categories (so-called QoS levels).

A minimum data transmission rate is not required for all data transmissions effected via the network 1. There are also so-called best-effort applications (e.g. data transmissions according to the TCP/IP Standard) in which the data transmission is not time-critical and the data is transmitted when the network has free transmission capacity. The data rate of best-effort applications is reduced if time slots need to be requested and allocated for the transmission of data within the scope of QoS applications. Thus, if rendered necessary by the allocation of time slots for QoS applications, the number of time slots allocated for best-effort applications is reduced. By this means, the assured stipulations for the QoS applications, particularly a guaranteed transmission quality, can always be fulfilled irrespective of the capacity utilization of the data network as a whole. Thus, time slots for a data flow of a best-effort application are allocated not only in dependence on the data rate of the data flow, but also in dependence on the data rates of data flows of other applications (e.g. QoS applications). An overloading of the data network can also be prevented through preference of the QoS applications over the best-effort applications in the allocation of existing time slots for the data transmission.

Figure 2:
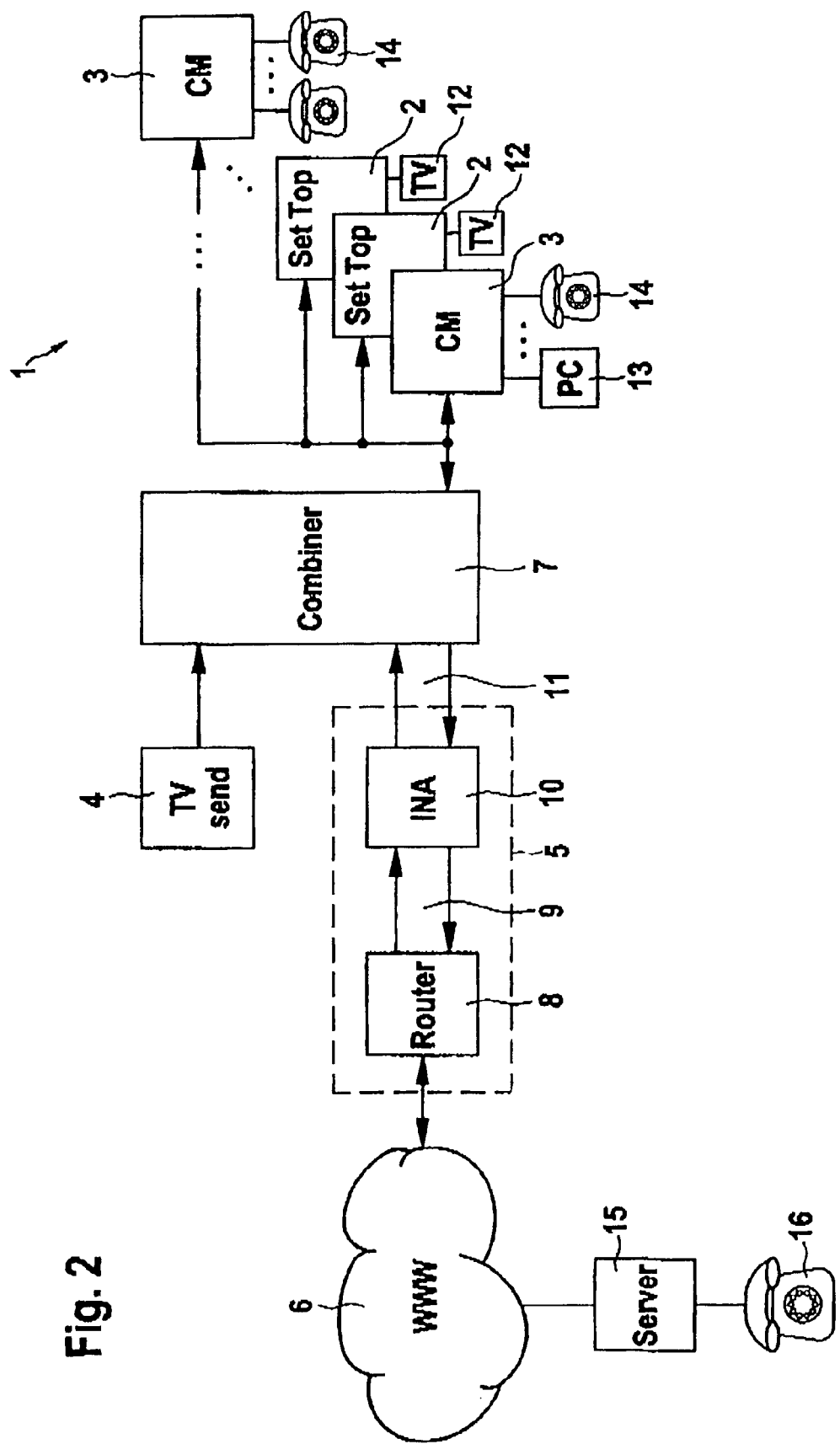
FIG. 2 shows a schematic representation of a data network for the realization of a procedure according to the invention.

FIG. 2 shows a preferred embodiment example of the data network 1 from FIG. 1. The data network 1 is in the form of a cable television network. Terminals 12, 13, 14 of users of the data network are connected, via the data network 1, to at least one service provider. The service provider is, for example, a cable television operator with which terminals, in the form of television sets 12, are connected via the cable television network 1. The cable television operator has a television transmitter 4 which transmits television signals to the television sets 12 via the cable television network 1. The television sets 12 are connected to the cable television network 1 via so-called set-top boxes 2. The service provider can also be an Internet service provider with which terminals, in the form of computers 13 or telephone sets 14, are connected via the cable television network 1. The Internet service provider has an INA 10 which is connected, via a router 8, to an Internet Protocol (IP) backbone network 6, e.g. the Internet 6. The INA 10 and the router 8 can be combined to form one device 5. The television transmitter 4 and the device 5 can also be part of the Internet 6.

Video and audio signals are transmitted from the television transmitter 4 to the set-top boxes 2, according to a predefinable standard, via the data network 1. Concrete examples of such a standard are DVB (Digital Video Broadcasting), which is used primarily in Europe, and DOCSIS (Data Over Cable Service Interface Specification), which is used particularly in the USA. The video and audio signals are transmitted via several channels in a television broadcast band.

In order that the cable television network 1 can also be used for any data applications, a combiner 7 is provided which combines the data signals and the television signals in the manner of a multiplexer and routes them, via the cable television network 1, to the terminals 12, 13, 14. Examples of data applications are Transfer Control Protocol (TCP)/IP applications (so-called Web browsing) and quality of service (QoS) applications (e.g. VoIP (Voice over Internet Protocol) applications) with particular stipulations in respect of the transmission quality.

The router 8 forwards IP data packets from the cable television network 1 to the Internet 6. The router 8 is additionally connected, via a bidirectional connecting line 9, to the interactive network adapter (INA) 10 which, in turn, is also connected, via a bidirectional connecting line 11, to the combiner 7. The router 8 and the INA 10 can also be combined in a single device.

The television signals emitted by the television transmitter 4 are transmitted, via the combiner 7 and the cable television network 1, to the set-top boxes 2 and further to the television sets 12. The set-top boxes 2 again divide up different data transmitted via the cable television network.

The IP data packets from the Internet 6 are transmitted, via the router 8, the INA 10, the combiner 7 and the cable television network 1, to so-called cable modems 3 and further to telephones 14 or appropriately equipped computers 13. The cable modems 3 serve to receive the data service via the cable television network 1.

Connected to the set-top boxes 2 are television sets 12, video recorders or other appliances suitable for receiving and processing the video and audio signals. Connected to the cable modems 3 are terminals such as, for example, computers 13 or telephones 14, which are suitable for use of the provided data application. For VoIP applications, the computers 13 are equipped with appropriate add-on modules which render possible the output and input of speech. A further telephone set 16 is connected to the Internet 6 via an Internet server 15. Within the scope of a VoIP application, for example, audio data is transmitted between the telephone set 16 and an appropriate terminal 13, 14.

Also provided as standard in a cable television network 1 are upstream channels which render possible a so-called upstream connection from the terminals 12, 13, 14 to the INA 10. The upstream channels are required for, for example, so-called video-on-demand and for a multiplicity of data applications. For certain data applications, for example, for VoIP applications, relatively large amounts of data are also transmitted via the upstream channel. The upstream channels, however, have only a small bandwidth, which can result in an impairment of the transmission quality. For certain data applications, it should also be possible for a predefinable quality of the data transmission to be guaranteed via the upstream channel (e.g. for QoS applications).

Figure 3:
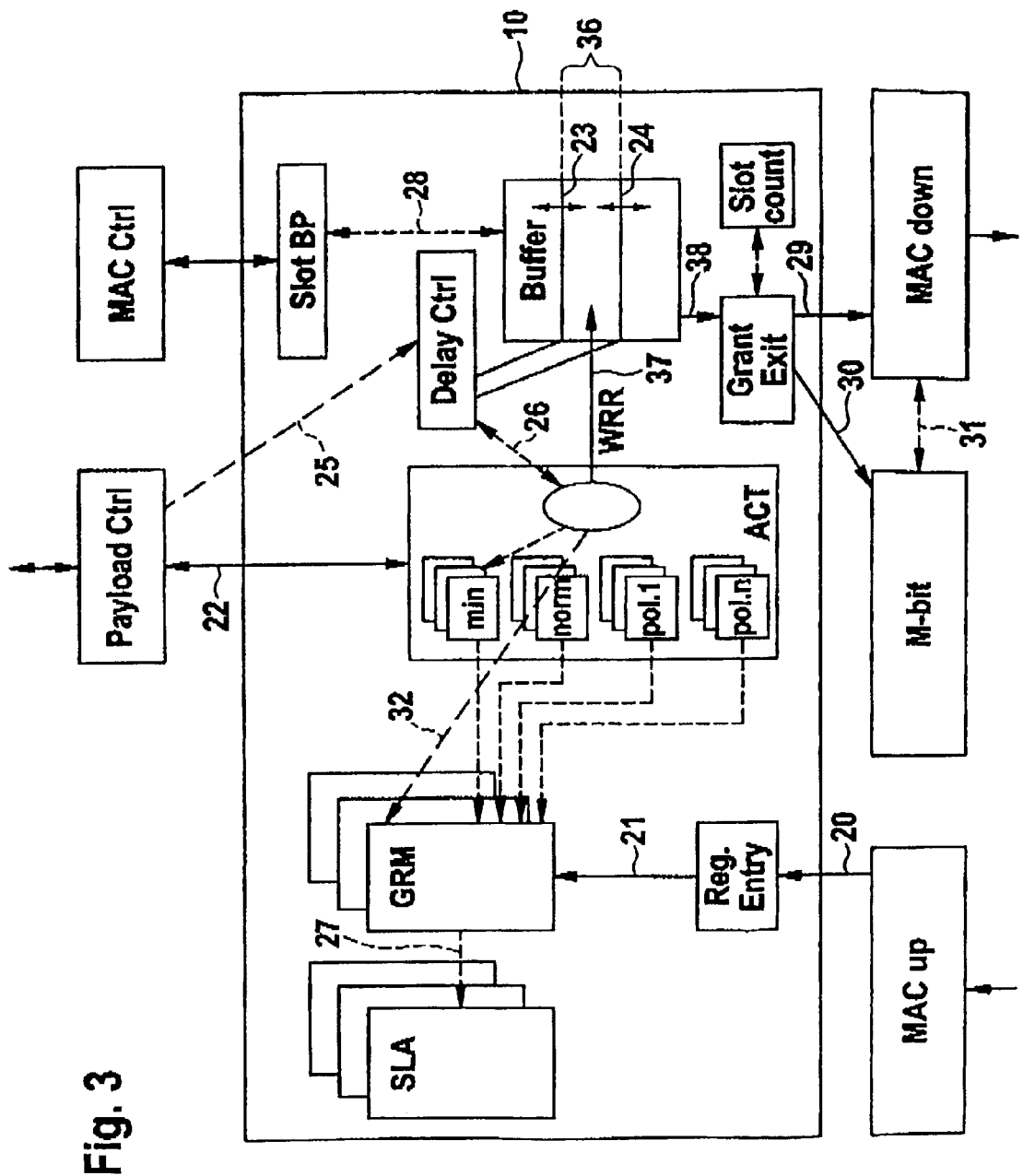
FIG. 3 shows a schematic representation of a controller, according to the invention, of the data network from FIG. 1.

FIG. 3 shows a controller 10, according to the invention, for a data network 1 according to a preferred embodiment. The controller 10 is in the form of an interactive network adapter (INA). It processes incoming requests 20 made by the terminals 12, 13, 14 for time slots for a data transmission (MAC up) via the data network 1. The terminal 12, 13, 14 seeking to send data via the data network 1 sends a request 20 for one or more time slots to the controller 10. Depending on the availability of time slots or depending on the capacity utilization of the data network 1 as a whole, the controller 10 allocates (MAC down) the requested number or fewer time slots to the terminal 12, 13, 14. The MAC message handler upstream unit (MAC up) serves to extract the requests from data packets of the MAC layer (link layer) of an ISO/OSI layer model. The MAC message handler downstream unit (MAC down) serves to package the data, via the allocated time slots, into data packets of the MAC layer.

In the controller 10, the requests 20 are forwarded to so-called grant request meters (GRM) via a pass-through unit, the grant request entry (Req. Entry). A separate grant request meter (GRM) is provided for each data flow in the data network 1. A packet-oriented (not line-oriented) connection between one of the terminals 12, 13, 14 of the data network 1 and one of the service providers 4, 5 is termed a data flow. In the grant request entry unit (Req. Entry) parameters of the requests 20 are converted to the data flows and transferred to the grant request meter (GRM) of the corresponding data flow.

Sum totals of all requests for time slots for data transmission are kept in the grant request meters (GRM) for the individual data flows. Upon the entry of a new request 20 for time slots for a particular data flow, the sum total of the corresponding grant request meter (GRM) is increased by the requested number of time slots. Following each allocation 29 of time slots for a particular data flow, the sum total of the corresponding grant request meter (GRM) is reduced by the allocated number of time slots. The sum totals represent a measure of the data quantity for which transmission capacity is requested. The sum totals kept in the grant request meters (GRM) supersede the queues for the requests known from the prior art. The introduction of the sum totals renders possible a more rapid processing. Also avoided are an overflow of the queue and a loss of requests which exceed the capacity of the queues. Finally, the sum totals have a substantially lesser memory space requirement than the queues. Respectively assigned to the sum totals in the individual grant request meters (GRM) are particular service level agreements (SLA) in which are stored different stipulations for the corresponding data flow. Normally, there are fewer service level agreements (SLA) than data flows in the data network 1, so that the same service level agreement (SLA) can be assigned to several data flows. The stipulations comprise, for example, information on how a data flow must be handled within the scope of a particular application. In particular, the stipulations comprise particular quality requirements for the data transmission via the data flows.

The controller 10 additionally comprises an active flows unit (ACT) in which the present invention is realized. In the active flows unit (ACT), all active data flows are stored in a multi-dimensional table. In the present embodiment example, the table has a two-dimensional scope, the one dimension of the table depending on stipulations for the quality of the data transmission via a data flow (so-called QoS level) and the other dimension depending on an allocation priority (so-called policy level) of the data flow. The allocation priority is represented by a wait time which corresponds to the difference between the instant of the planned allocation of time slots for the data flow and the current time. For example, a distinction can be made, on the basis of the QoS level, between a data flow for a best-effort application and a data flow for a QoS application. The QoS level can also be used to distinguish between different requirements for the QoS applications. The QoS level and further stipulations for the quality of the data transmission of the data flows are stored in the service level agreement (SLA).

References to objects of the data flows are stored in the fields of the table, thereby saving a substantial amount of memory space. A substantially more rapid processing of the table is also possible. The references to the data flows are stored in the fields of the table in dependence on the policy level assigned to the corresponding data flow and on the QoS level assigned to the data flow.

For the purpose of allocating time slots, data flows are picked out of the table according to a predefinable strategy. The predefinable allocation strategy comprises the sequence of processing of the data flows stored in the fields of the table. The use of various strategies is conceivable. The strategies should only be designed in such a way that previously agreed quality stipulations for data flows of QoS applications can be met in any case.

The wait time of a data flow is increased by a variable wait time increment if time slots have been assigned to the data flow. The magnitude of the wait time increment is dependent on the number of allocated time slots and on the quality requirements agreed for the data transmission via this data flow. The wait time is reduced as time progresses.

The wait times of the active data flows are divided into different categories, so-called policy levels. If, following an increase by the wait time increment, the wait time of a data flow exceeds an upper time limit of the policy level hitherto, the next lower policy level is assigned to the data flow. If the wait time becomes shorter as time progresses, jumps into the next higher policy level are also possible. Jumps by several policy levels at once are also possible. The introduction of the policy levels simplifies the handling of the individual data flows considerably. In the table in the active flows unit (ACT), the active data flows are thus stored in different fields in dependence on the QoS level and the policy level.

In the active flows unit (ACT), an allocation procedure is provided in the form of a so-called weighted round robin (WRR). Determined in the weighted round robin (WRR) are the processing times for the individual data flows for the allocation of the time slots. It is determined in the weighted round robin (WRR) how the information from the table is moved onwards; weightings are allocated and the available processor time is allocated to the data flows to be processed.

The weighted round robin (WRR) shifts the information relating to the allocation of the time slots into a ring buffer, future grants output buffer (Buffer). The information relating to the time slots assigned to the different data flows is written into a write range 36 of the ring buffer (Buffer). More precisely, the information is written into a field (so-called slot), within the write range 36 of the ring buffer (Buffer), to which a write pointer 37 points. The position of the write pointer 37 is determined in dependence on the allocation instant of the currently processed data flow. The allocation instant can be specified either absolutely or relatively in the form of the wait time (difference between the allocation instant and the current instant).

The write range is delimited by a variable first upper time threshold (maximum granting threshold) 23 and a variable first lower time threshold (minimum granting threshold) 24. The positions of the thresholds 23, 24 in the ring buffer (Buffer) are determined by a delay control unit (Delay Ctrl.). In the delay control unit (Delay Ctrl.), the positions of the thresholds are determined, for example, in dependence on the necessary capacity of the ring buffer (Buffer), in dependence on the speed at which information read out of the fields of the ring buffer (Buffer) are transferred away into the MAC layer, or in dependence on stipulations and limiting values 25.

The stipulations and limiting values 25 are transmitted from a payload control unit (Payload Ctrl.) to the delay control unit (Delay Ctrl.). The payload control unit (Payload Ctrl.) represents a protocol interface which is responsible for servicing of the signalling protocols (e.g. connection set-up/ connection tear-down). The weighted round robin (WRR) writes information 26 relating to the capacity utilization of the system into the delay control (Delay Ctrl.) so that the thresholds 23, 24 can be varied accordingly.

The queue (buffer) receives information 28 from a slot boundary pattern unit (Slot BP) which receives information from a MAC control unit (MAC Ctrl.). The slot boundary pattern unit (Slot BP) represents an interface to a process which defines the frequency at which the time slots are allocated. The assigned time slots 29 are transferred, via a grant exit unit, out of the queue (Buffer) to the MAC message handler downstream (MAC down) at the determined instants. The information 29 is asynchronously read out of a particular memory area of the queue (buffer). The grant exit unit is connected to a slot counter (Slot Count) which enables terminals 12, 13, 14 (e.g. modems) to identify the absolute time. The slot counter (Slot Count) is responsible for a synchronization between the layer 1 and the layer 2 of the ISO/OSI layer model. The grant exit unit also transfers information 30 to an M-bit pattern generator (M-Bit). A synchronization 31 occurs between the M-bit pattern generator (M-Bit) and the MAC message handler downstream (MAC down).

The advantages of the present invention consist particularly in the fact that the data flows are stored in a table from which they can be picked out, rapidly and without a large amount of processing, according to a predefinable allocation strategy for the allocation of time slots. In order to reduce the memory space of the table, only references to the data flows and the information stored, for example, in the service level agreement (SLA) are stored in the fields of the table.

Figure 4:
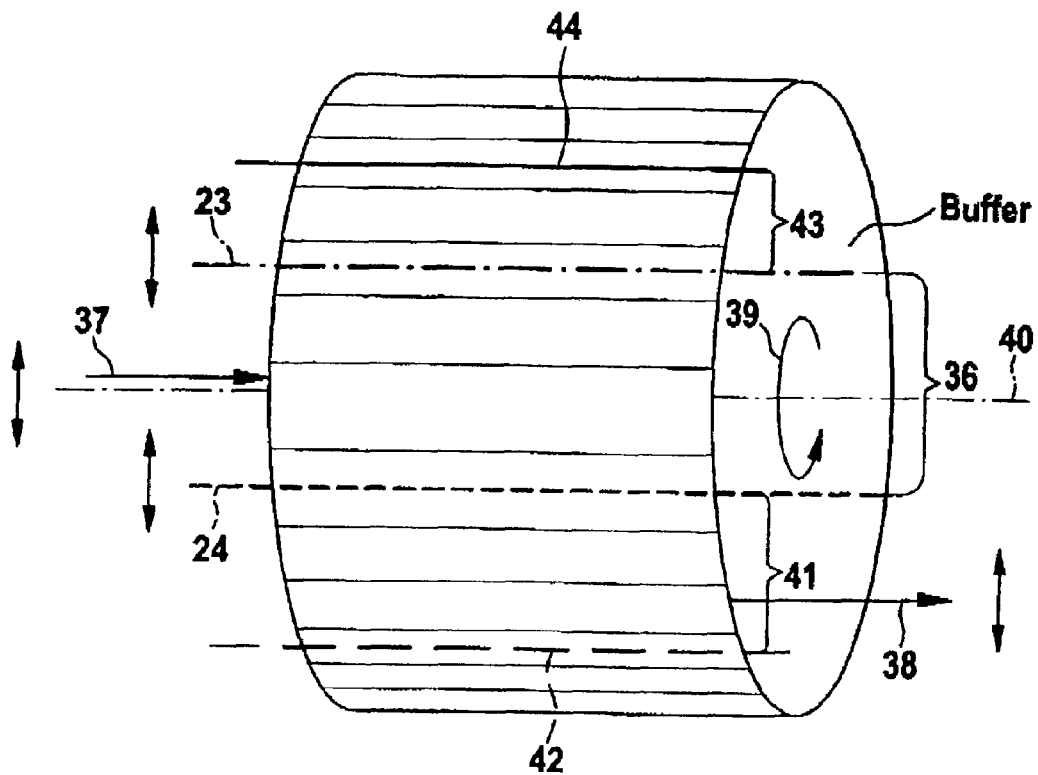
FIG. 4 shows a ring buffer of the controller from FIG. 3.

FIG. 4 shows an isolated view of the ring buffer (Buffer) of the controller 10. The ring buffer (Buffer) represents a management structure which renders possible prospective planning of the allocation of the time slots in a simple manner which saves system resources. The ring buffer (Buffer) revolves at a predefinable clock rate (e.g. 3 ms) about an axis of rotation 40 in the direction of an arrow 39. The ring buffer is normally realized by means of software. It comprises the write pointer 37 which points to a field of the ring buffer (Buffer) within the write range 36. A temporal read range 41, temporally preceding the write range 36, is defined by a first lower time threshold 24 and a second lower time threshold (Now on the Wire) 42. A read pointer 38 is provided which points to one of the fields within the read range 41. The time slots assigned to the individual data flows and stored in the ring buffer (Buffer) are extracted from the field of the ring buffer (Buffer) to which the read pointer 38 points. The position of the read pointer 38 is determined in dependence on the speed at which the read-out time slots are transferred to the MAC layer and further to the terminals 12, 13, 14.

The ring buffer (Buffer) revolves relative to the write and read positions of the write pointer 37 and of the read pointer 38 respectively so that, following a complete revolution of the ring buffer (Buffer), each field has been once at the write position and once at the read position. The write range 36 and the read range 41 are thus not assigned to particular fields of the ring buffer (Buffer), but to particular time ranges.

A temporal definition range 43, temporally succeeding the write range 36 and in which the fields in the write range 36 are defined as particular types, is defined by the variable first upper time threshold 23 and a second upper time threshold (End of Defined List) 44. For example, particular fields of the ring buffer (Buffer) can be reserved for data flows of QoS applications through appropriate entries in the definition range 43. The definition range 43 is used, for example, in the case of DVB for the so-called ranging slots, contention slots, reservation slots or fixed-rate slots.

Figure 5:
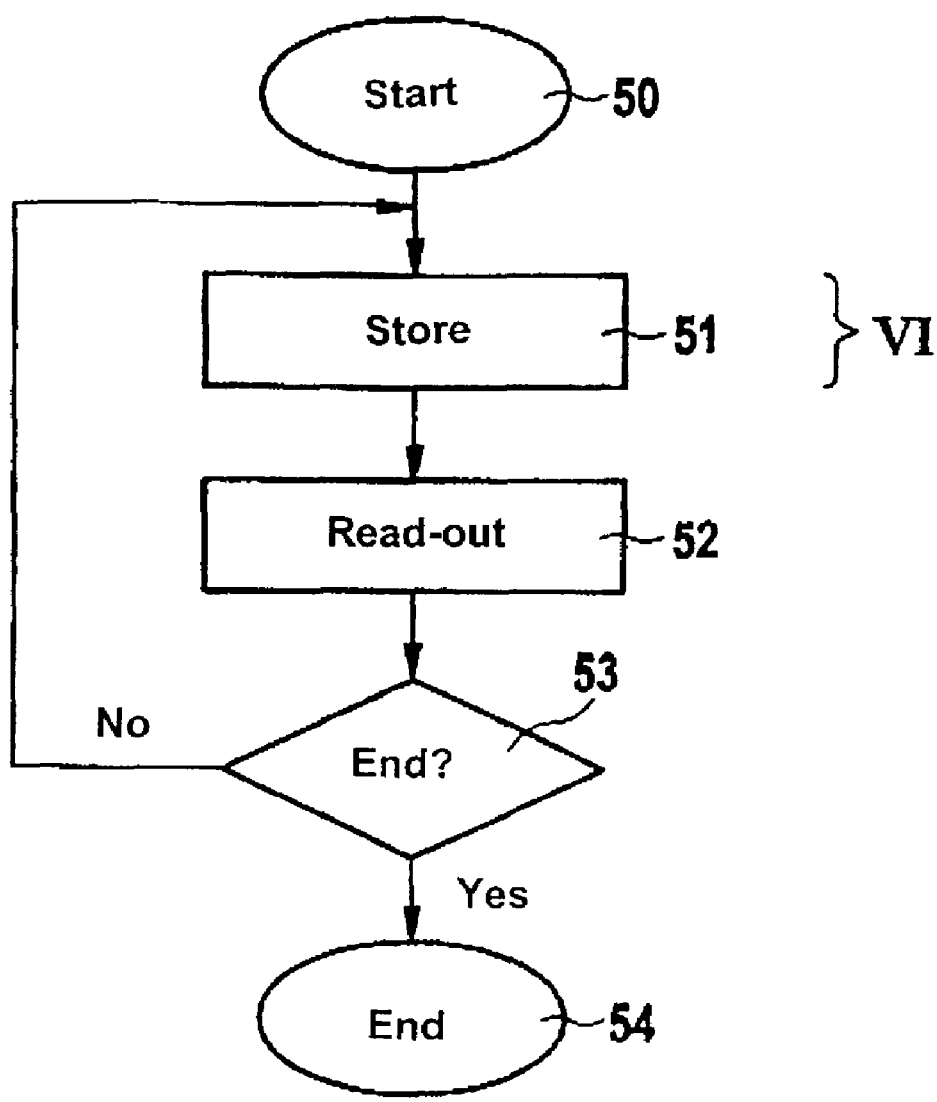
FIG. 5 shows a flow diagram of a procedure according to the invention.

FIG. 5 shows a flow diagram of a procedure according to the invention. The procedure according to the invention is applicable to all physical data networks 1 in which the award of time slots for each data transmission must be negotiated between the terminals 12, 13, 14 and the controller 10 and the allocation of time slots must be planned and coordinated in advance. The procedure is executed in the controller 10 from FIG. 2. It commences in a function block 50. Two tasks are then performed in succession in the function blocks 51, 52. In the function block 51, the information, relating to the time slots assigned to a data flow, which has been shifted by the weighted round robin (WRR) to the ring buffer (Buffer) is stored in a particular field of the ring buffer (Buffer). In the function block 52, the information stored in the fields of the ring buffer (Buffer) is extracted from the fields, ideally at the allocation instant of the data flow, transferred further to the MAC layer and allocated to the terminals 12, 13, 14 for a data transmission via the data flow. The two tasks are performed cyclically until the end of the procedure is ascertained in a query block 53. The procedure is terminated in a function block 54. Alternatively, the tasks can be called up from a higher-order control program, also, for example, through interrupts at particular instants or event-controlled, (asynchronous execution).

Figure 6:
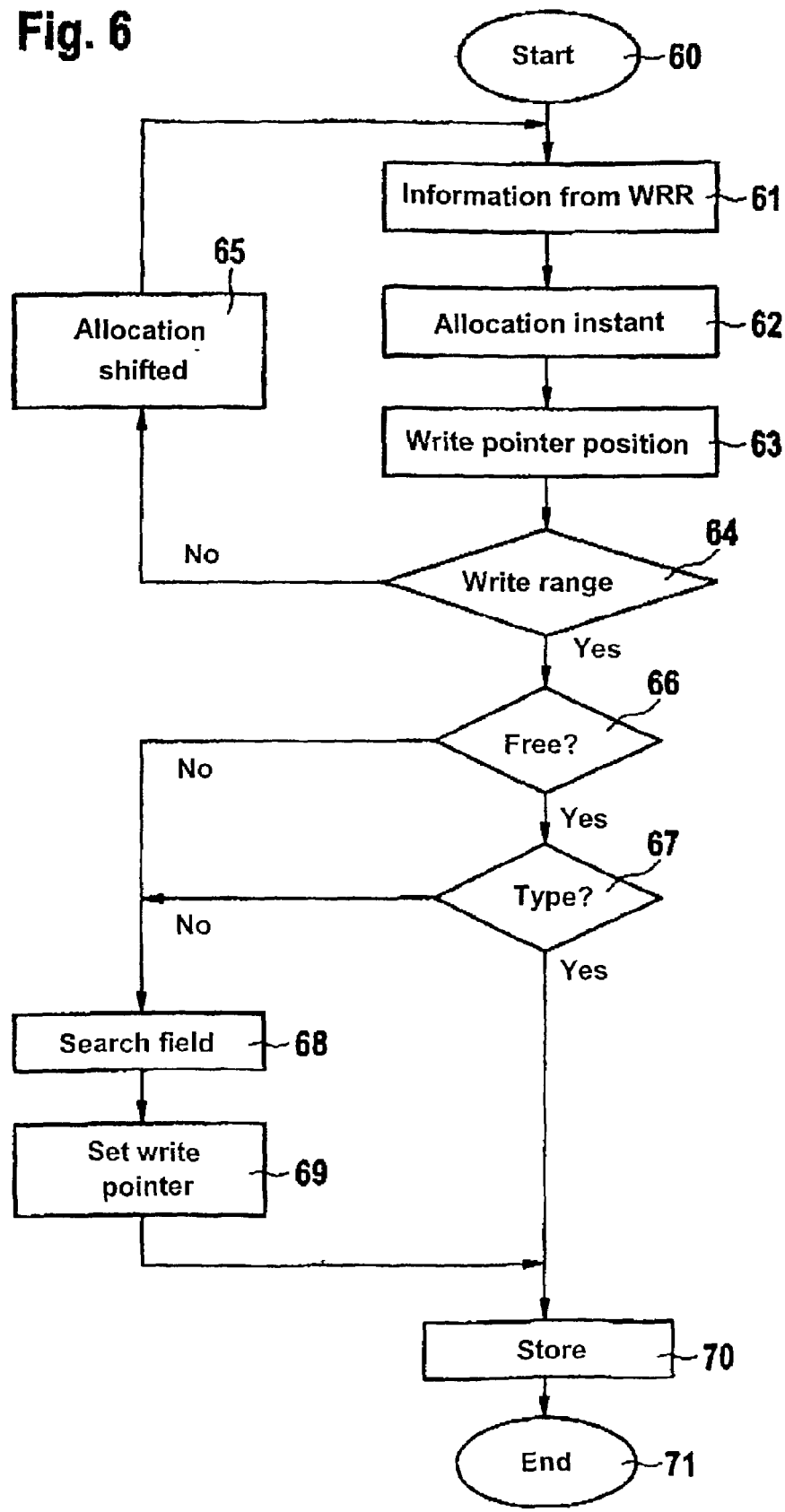
FIG. 6 shows a flow diagram of a task for processing requests within the scope of the procedure according to the invention from FIG. 5.

FIG. 6 shows in detail a flow diagram of the task from function block 51 of FIG. 5. The task commences in a function block 60. The information received from the weighted round robin (WRR) is accepted in a function block 61. The information comprises, for example, references to objects which contain the allocation instant of the data flow, the number of time slots assigned to the data flow, and other information. The allocation instant of the data flow via which information was received in the function block 61 is read-in in a function block 62. In a function block 63, the position of the write pointer 37 is determined, in dependence on the allocation instant, in a manner already explained in detail above.

A query block 64 checks whether the field of the ring buffer (Buffer) to which the write pointer 37 points lies within the write range 36. If the field lies outside the write range 36, this means that the allocation of time slots for this data flow is still too remote. In this case, therefore, a branching operation is performed to a function block 65 in which the allocation of time slots for this data flow is shifted to a later instant. From the function block 65, a branching operation is performed to the function block 61, where information relating to a further data flow is accepted from the weighted round robin (WRR) and the further procedural steps for this data flow are executed.

If the field of the ring buffer (Buffer) to which the write pointer 37 points lies within the write range 36, a query block 66 checks whether the field is free. If it is, a further query block 67 checks whether the field to which the write pointer 37 points corresponds to a required type. If the data flow is, for example, part of a best-effort application, the information relating to the time slots assigned to this data flow should not be stored in a field which is reserved for a QoS application.

If the field to which the write pointer 37 points is already occupied and/or if the field is not of the required type, a branching operation is performed to a function block 68 in which a field is determined which is closest to the field determined in the function block 63 and is both free and of the required type. The write pointer 37 is then set to this newly determined field in a function block 69. In a function block 70, the information, received from the weighted round robin (WRR) relating to the time slots assigned to the data flow are stored in the field to which the write pointer 37 points.

Figure 7:
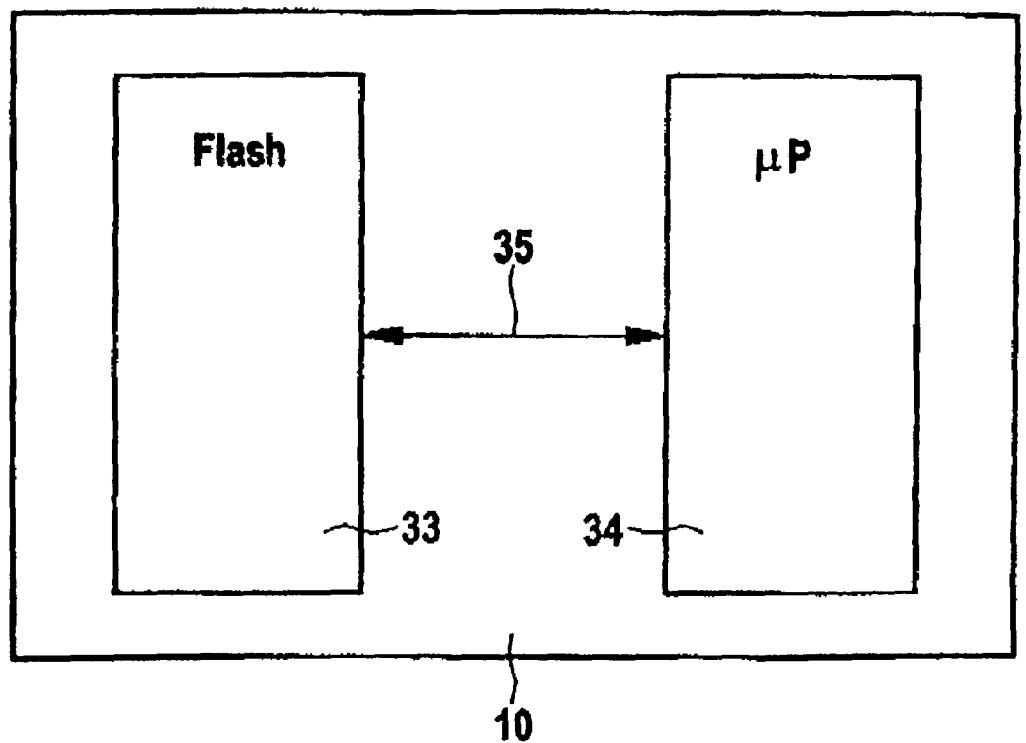
FIG. 7 shows another view of the controller from FIG. 3.

FIG. 7 shows a representation of the controller 10. The controller 10 comprises a storage element 33 on which a computer program is stored. The storage element 33 is in the form of an electronic storage medium, for example, a flash memory. The computer program can be executed on a computing device 34 of the controller 10. For the purpose of execution of the computer program on the computing device 34 the computer program is transferred, either in its entirety or instruction by instruction, out of the storage element 33 to the computing device 34 via a data transmission connection 35. The computer program, when run on the computing device 34, is suitable for execution of the procedure according to the invention.

The invention claimed is:

1. Procedure for the allocation of time slots for a transmission of data in variable time slots between a controller of a packet-oriented data network on the one hand and a terminal of a user of the data network on the other hand,
   the time slots for the data transmission being assigned to a terminal for a data flow following request made by the terminal and in dependence on the transmission capacity available in the data network, and
   being temporarily stored in a ring buffer before they are allocated to the terminal at a predefinable allocation instant,
   wherein in the ring buffer a temporal write range is defined by a variable first upper time threshold and a variable first lower time threshold, a position of a write pointer to a field of the ring buffer within the write range is determined in dependence on the allocation instant and the time slots assigned to the terminal for the data flow are stored in a field corresponding to the position of the write pointer.

2. Procedure according to claim 1, wherein a temporal read range is defined by the variable first lower time threshold and a second lower time threshold, a read pointer points to a field of the ring buffer within the read range in dependence on a speed at which the read-out time slots are transferred to the terminals, and the time slots assigned to the terminal for the data flow are extracted from the field to which the read pointer points.

3. Procedure according to either of claim 1, wherein for the purpose of storing the assigned time slots in the ring buffer, the field, within the write range, to which the write pointer points is determined and the write pointer is displaced to the nearest free field within the write range if the determined field is already occupied.

4. Procedure for the allocation of time slots for a transmission of data in variable time slots between a controller of a packet-oriented data network on the one hand and a terminal of a user of the data network on the other hand,
   the time slots for the data transmission being assigned to a terminal for a data flow following request made by the terminal and in dependence on the transmission capacity available in the data network, and
   being temporarily stored in a ring buffer before they are allocated to the terminal at a predefinable allocation instant,
   wherein in the ring buffer a temporal write range is defined by a variable first upper time threshold and a variable first lower time threshold, a position of a write pointer to a field of the ring buffer within the write range is determined in dependence on the allocation instant and the time slots assigned to the terminal for the data flow are stored in a field corresponding to the position of the write pointer and
   wherein a temporal definition range is defined, temporally preceding the write range, by a second upper time threshold and the variable first upper time threshold, in which fields in the write range are defined as particular types.

5. Procedure according to claim 4, wherein for the purpose of storing the assigned time slots in the ring buffer, the field, within the write range, to which the write pointer points is determined and the write pointer is displaced to the nearest field of a predefined type within the write range if the determined filed is not of the predefined type.

6. Controller for a packet-oriented data network for the transmission of data in variable time slots between the controller on the one hand and a terminal of a user of the data network on the other hand, with means for receiving and processing a request made by a terminal for time slots, and with means for allocating time slots upon the request made by the terminal, the means for allocation assigning the time slots to a terminal in dependence on the transmission capacity available in the data network (1) and temporarily storing them in a ring buffer before the means for allocation allocate the time slots to the terminal at a predefinable allocation instant, wherein the means for allocation comprise:

means for the definition of a temporal write range in the ring buffer by a variable first upper time threshold and a variable first lower time threshold;

means for determining a position of a write pointer (37) to a field of the ring buffer within the write range in dependence on the allocation instant; and means for storing the time slots assigned to the terminal for the data flow in a field corresponding to the position of the write pointer.

7. Controller for a packet-oriented data network for the transmission of data in variable time slots between the controller on the one hand and a terminal of a user of the data network on the other hand, with means for receiving and processing a request made by a terminal for time slots, and with means for allocating time slots upon the request made by the terminal, the means for allocation assigning the time slots to a terminal in dependence on the transmission capacity available in the data network (1) and temporarily storing them in a ring buffer before the means for allocation allocate the time slots to the terminal at a predefinable allocation instant, wherein the means for allocation comprise:

means for the definition of a temporal write range in the ring buffer by a variable first upper time threshold and a variable first lower time threshold;

means for determining a position of a write pointer (37) to a field of the ring buffer within the write range in dependence on the allocation instant; and means for storing the time slots assigned to the terminal for the data flow in a field corresponding to the position of the write pointer; and wherein the controller has means for executing a procedure according to claim 2.

8. Computer program which operable to be executed on a computing device and embodied on a computer-readable medium, of a controller for a packet-oriented data network for the transmission of data in variable time slots, wherein the computer program, when run on the computing device, is suitable for executing a procedure according to claim 1.

9. Computer program according to claim 8, the computer program being stored on a storage element, particularly on a random-access memory, a read-only memory or a flash memory.

\* \* \* \* \*